United States Patent
Matsubara et al.

(10) Patent No.: US 7,181,342 B2
(45) Date of Patent: Feb. 20, 2007

(54) VEHICULAR NAVIGATION DEVICE

(75) Inventors: Tsutomu Matsubara, Tokyo (JP); Masato Hirai, Tokyo (JP); Kenta Kawahara, Tokyo (JP); Kenichi Ogawa, Tokyo (JP); Tatsuya Mitsugi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 12 days.

(21) Appl. No.: 10/485,142

(22) PCT Filed: Mar. 15, 2002

(86) PCT No.: PCT/JP02/02515

§ 371 (c)(1),
(2), (4) Date: Jan. 29, 2004

(87) PCT Pub. No.: WO03/078930

PCT Pub. Date: Sep. 25, 2003

(65) Prior Publication Data
US 2004/0176906 A1 Sep. 9, 2004

(51) Int. Cl.
*G01C 21/00* (2006.01)
(52) U.S. Cl. .............. 701/200; 701/208; 701/211; 701/212; 701/214; 340/995.17; 340/995.18
(58) Field of Classification Search ............. 701/200, 701/208, 211, 212, 214; 340/988, 990, 995.17, 340/995.18
See application file for complete search history.

(56) References Cited

U.S. PATENT DOCUMENTS

| 5,944,768 A * | 8/1999 | Ito et al. ............. 701/200 |
| 6,212,473 B1 * | 4/2001 | Stefan et al. ............. 701/210 |
| 6,335,702 B1 * | 1/2002 | Itoh et al. ............. 342/357.01 |
| 6,526,275 B1 * | 2/2003 | Calvert ............. 455/418 |
| 6,707,421 B1 * | 3/2004 | Drury et al. ............. 342/357.1 |
| 2002/0069360 A1 * | 6/2002 | Thoone et al. ............. 713/185 |
| 2002/0078230 A1 * | 6/2002 | Hals et al. ............. 709/238 |
| 2002/0120455 A1 * | 8/2002 | Nakata ............. 704/275 |
| 2003/0014187 A1 * | 1/2003 | Chun et al. ............. 701/209 |
| 2004/0093156 A1 * | 5/2004 | Seto et al. ............. 701/211 |
| 2004/0104842 A1 * | 6/2004 | Drury et al. ............. 342/357.13 |

FOREIGN PATENT DOCUMENTS

| JP | 2-224100 A | 9/1990 |
| JP | 8-50698 A | 2/1996 |

* cited by examiner

*Primary Examiner*—Gertrude Arthur-Jeanglaude
(74) *Attorney, Agent, or Firm*—Birch, Stewart, Kolasch & Birch, LLP

(57) ABSTRACT

A vehicular navigation device for presenting a navigation content by continuing a predetermined inputting operation for navigation till the last step even if the used state changes. The navigation device comprises a presentation unit (6) for presenting a navigation content, a manual input unit (3) for receiving a plurality of inputting operations, a speech input unit (4) for receiving a speech input operation substantially identical to that of the manual input unit (3), a database (5) stored with data necessary for navigation, and a control unit (2) for providing the navigation content to the presentation unit (6) by searching the database (5) according to the inputting operation from the manual input unit (3) or the speech input unit (4). Depending on the used state of the navigation device (1), the control unit (2) switches the active state between the manual input unit (3) and the speech input unit (4) so as to continue the predetermined navigation search operation to the last step thereby to present the navigation contents.

16 Claims, 14 Drawing Sheets

STOPPED IN MOTION

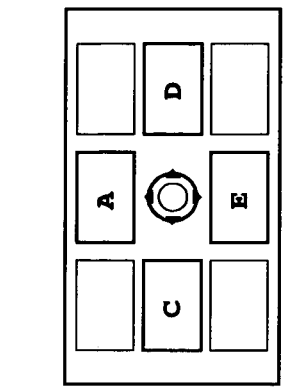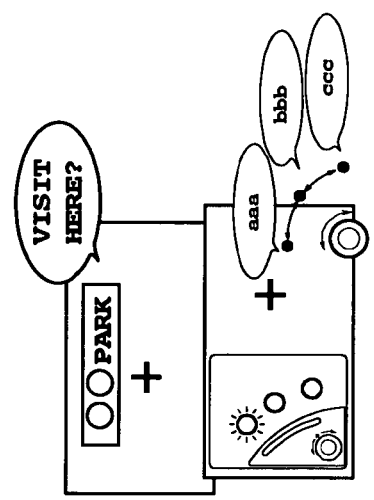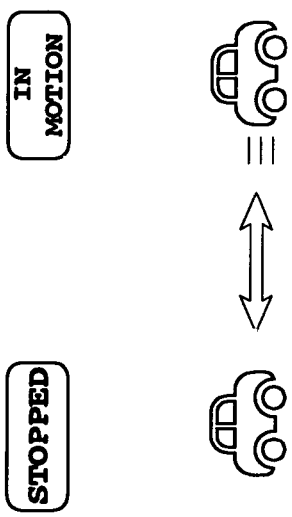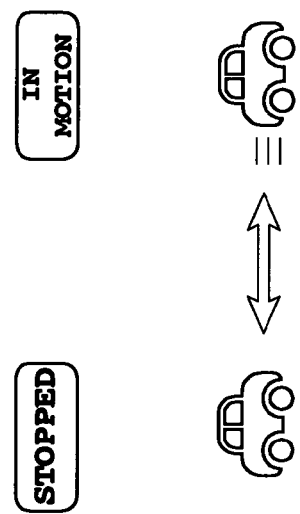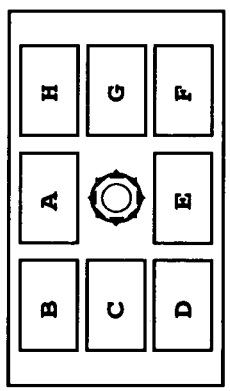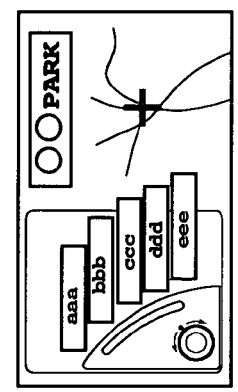
Fig.8(a)  Fig.8(b)

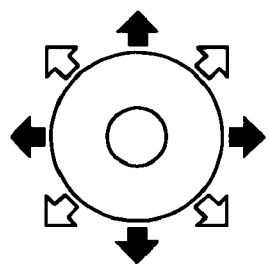 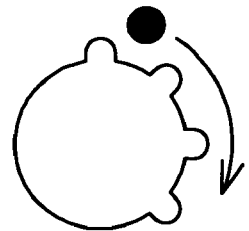
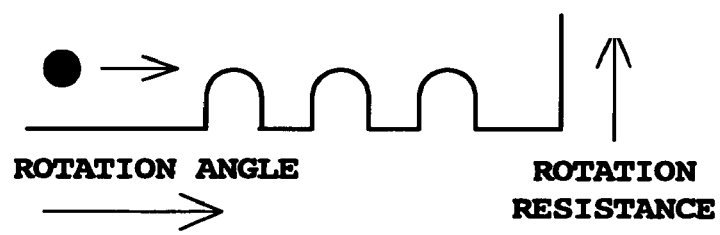
Fig.13(a)　　　Fig.13(b)

VEHICULAR NAVIGATION DEVICE

TECHNICAL FIELD

The present invention relates to a vehicle navigation system, and more particularly to a vehicle navigation system that allows a user to smoothly and continuously perform a desired input operation for navigation, whether the vehicle is parked or in motion.

BACKGROUND ART

As automobiles have become more and more intelligent, the demand for automobiles which can be more comfortably driven has led to the installation of various electronic apparatuses. In particular, vehicle navigation systems (hereinafter referred to simply as "navigation systems") that guide an automobile to a destination in an unknown area without becoming lost or using a map have become very popular. Recent navigation systems not only guide an automobile to a destination through the shortest route, but many have multiple functions for providing a variety of information to enhance the driving experience. For example, many navigation systems in practical use not only provide information on recommended routes using real-time traffic information, such as information on traffic snarl-up and closure, in order to guide the automobile to a destination, but also provide information on recommended facilities (for example, amusement facilities, popular restaurants, beauty spot, and so on) near or along a route to a destination.

Operating such a navigation system is commonly performed using a special remote control unit or through a keyboard or joystick provided near the driver's seat. There are also navigation systems with touch panel buttons on the display screen that allow the user to operate the system by selecting among sequentially displayed items. In the following description below, all of the operation types described above are collectively referred to as "manual input type". In addition, recent progress in the voice recognition technology has made it possible for users to operate navigation systems using voice commands. A user of this type of navigation system performs necessary input operations in response to voice guidance messages from the navigation system. Hereafter, this type of input is referred to as "voice input type".

Conventionally, both the manual input type and the voice input type require the user to perform operation in a predetermined order to display desired information.

However, for a user to receive various types of additional information (information on recommended routes and recommended facilities) as described above, it is necessary to select necessary information from a vast amount of information. That is, the user must enter necessary multiple conditions for information selection.

In general, when a car is parked, it is possible for the driver to perform multiple input operations for searching a route because no problem is presented by the driver concentrating on the operation of the navigation system. However, when the car is in motion, it is not recommended that the driver frequently perform operations other than driving. For this reason conventional navigation systems commonly impose restrictions on their operation which prevent a driver from performing manual input operation while viewing the display. As such, a problem with present manual input type navigation systems is that the user cannot operate the system while the car is in motion. Another problem with a manual input type navigation system is that an input operation begun while the car was idling, such as while waiting at a stoplight, is forcibly suspended when the user resumes driving, and therefore the operation cannot be performed continuously and the operability is decreased.

On the other hand, a voice input type navigation system, in which the user responds to voice guidance messages, does not require the user to continuously view the display, and allows the user to perform input operation of the navigation system even during driving. However, speech recognition systems are unable to accept voice commands, even when previously defined, unless the command is given in a specific situation. If an appropriate voice command is not entered, the navigation system repeatedly outputs the same voice guidance message, and errors not uncommonly result. That is, operating a navigation system through voice input requires training and therefore there is a problem that use of a high functionality navigation system is undesirably complicated or difficult.

In addition, various background noises inside or outside of a car can impede the accuracy of voice recognition, sometimes resulting in voice recognition errors. Although some conventional navigation systems allow for both manual input and voice input, none of those systems allow input to be switched between manual input and voice input during operation. That is, a user having difficulty using voice input and wishing to switch to manual input is forced to repeat the operation from the beginning. This makes the system difficult to use.

The present invention seeks to solve the problems associated with the art described above. It is an object of the present invention to provide a navigation system that allows the user to smoothly and continuously perform a desired navigation search whether the vehicle is parked or is in motion and whether the input is of a manual input type or voice input type.

DISCLOSURE OF THE INVENTION

To achieve the above object, the present invention provides a vehicle navigation system comprising a presentation unit presenting navigational content; a manual input unit accepting a plurality of input operations; a voice input unit accepting vocally, input operations of substantially the same contents as those of the manual input unit; a database storing data necessary for navigation; and a controller searching the database based on the input operations of the manual input unit or the voice input unit for presenting navigational content on the presentation unit, wherein the controller switches an active status between the manual input unit and the voice input unit based on a usage status of the navigation system, continues predetermined input operations for navigation until a final step is reached, and presents the navigational content.

Switching an active status between the manual input unit and the voice input unit based on a usage status of the navigation system includes a direct switching instruction from the user or automatic switching based on other factors.

This configuration allows the controller to switch the operation as necessary during the manual input operation and voice input operation, making it possible to continuously execute the input operation, using means suitable for the usage status of the navigation system, without interrupting a series of input operations for navigation.

To achieve the above object, the present invention as described above may also be configured such that the controller identifies the usage status of the navigation system based on whether or not the vehicle is in motion, and switches the active status between the manual input unit and the voice input unit.

In this configuration, appropriate input means can be used according to the usage status of the vehicle to smoothly perform the input operation for navigational search.

To achieve the above object, the present invention as described above may also be configured such that the controller forces the voice input unit to activate when a number of operations of the manual input exceeds a predetermined number while the vehicle is in motion.

The predetermined number of times may be, for example, the number of operations permitted while the vehicle is in motion that is defined by self-imposed restrictions. For example, the number of operations permitted may be three. This configuration forces the operation to switch to voice input before the user is disturbed in driving, thus allowing the input operation for navigation to be continued even while the vehicle is in motion.

To achieve the above object, the present invention as described above may also be configured such that the controller switches the active status between the manual input unit and the voice input unit for mutually complementing each other between the input operations of the manual input unit and those of the voice input unit.

The mutual complement of input operations means that, when the user is confused about the operation during manual input or voice input, the input operation is complemented by switching to an easier-to-operate method. For example, when actual input items are not known or the input operation is complicated during manual input, the input is switched temporarily to voice input that gives voice guidance. Conversely, when the navigation system fails to recognize a user's speech during voice input during voice input and cannot continue operation, item selection through manual input is executed temporarily. This configuration combines manual input with voice input for smoother input operation.

To achieve the above object, the present invention as described above may also be configured such that, when the usage status of the navigation system indicates in-motion status, the controller displays the navigational content in an enlarged format on a display of the presentation unit.

This configuration allows the user to easily identify necessary display content when the user wishes to identify displays or to select displayed contents even while the vehicle is in motion, and therefore allows the user to continue the input operation smoothly.

To achieve the above object, the present invention as described above may also be configured such that, when the usage status of the navigation system indicates in-motion status, the controller displays the navigational content in an enlarged, simplified format on the display of the presentation unit and, at the same time, vocally presents the displayed content.

The enlarged, simplified display is an enumeration of simple marks. This configuration makes it easy to associate displayed contents presented through voice with displayed contents on the display and enables the user to easily and accurately identify and select displayed contents on the display.

To achieve the above object, the present invention as described above may also be configured such that the controller includes a skip acceptance processor that skips a portion of operation steps necessary for input operations using the manual input unit when the voice input unit accepts corresponding input operations.

In this configuration, the user can omit voice input items. For example, when specifying a destination, the user can skip the selection of an area and directly enter a telephone number, an address, or a facility name. As the user gets accustomed to the operation of the navigation system, the user can simplify the operating procedure for speedy operation.

To achieve the above object, the present invention as described above may also be configured such that the controller includes a reaction change processor that causes the manual input unit to change a reaction in the manual input unit according to the navigational content presented on the presentation unit when the input operations are performed using the manual input unit.

The reaction change in the manual input unit is, for example, a change in the click feeling during rotation or a change in rotation resistance when the input operation is performed though rotation operation. The rotation range can also be changed. Similarly, when the input operation is performed through tilting operation, the tilting positions, the tilting resistance, and the click feeling at tilting time can be changed. The sound that is generated can also be changed according to the way the manual input unit is used. In such a configuration, different reactions can be produced according to presented navigational content (selection items and so on) by changing the reaction produced by one manual input unit, and an appropriate selection operation can be performed based on the reaction by the manual input unit.

To achieve the above object, the present invention as described above may also be configured such that, when the input operations are suspended for at least a predetermined length of time during the input operations of the manual input unit or the voice input unit, the controller gives vocal guidance on a next operation.

The input operation is suspended for at least a predetermined time, for example, when the user does not know the next input item because the user cannot hear the voice guidance and the operation is suspended or when the user does not know operating procedure and the operation is suspended during manual input or voice input. In this configuration, the system gives the guidance of the next operation at a right time to continue the input operation smoothly.

To achieve the above object, the present invention as described above may also be configured such that the controller includes an interrupt controller that gives guidance on the voice input operation through an interrupt operation of the manual input unit during the input operation via the voice input unit.

The interrupt operation is the input operation of a predetermined command using the manual input unit during voice input, for example, a request to repeat voice guidance. That is, when the user fails to hear the voice guidance during voice input or desires to receive the guidance again, the user temporarily uses the manual input unit to enter a command in order to repeat the voice guidance. This configuration makes voice input process smoother.

To achieve the above object, the present invention as described above may also be configured such that the controller switches the active status between the manual input unit and the voice input unit for controlling vehicle attachment units.

The vehicle attachment units are units for supporting vehicle driving, including units that collect information necessary for navigation such as a radio receiver, Internet system, TV set, CD-ROM drive, DVD-ROM drive, and narrow band wireless system (DSRC). This configuration makes it possible to rapidly collect appropriate information by switching the combination of manual input and voice input.

To achieve the above object, the present invention as described above may also be configured such that the controller includes a plurality of media-based information collection units and wherein the database comprises by-information databases each individually storing information in one category, the information being obtained by the media-based information collection units from a plurality of media.

In this configuration, information collected from various media is stored sequentially in the by-information databases and therefore necessary information can be searched for speedily. In particular, the ability to make direct search during manual input or voice input reduces the number of search operations.

To achieve the above object, the present invention as described above may also be configured such that the media-based information collection units access media inside and external to the vehicle to store necessary information in the by-information databases.

In this configuration, various types of information is collected from sources within and outside of the vehicle, and by-information databases, which serve many purposes, can easily be created. To achieve the above object, the present invention provides a vehicle navigation system comprising a presentation unit presenting navigational content; an input unit accepting a plurality of input operations; media-based information collection units each collecting information in one category from a plurality of media; by-information databases each individually storing information collected in one category; and a controller searching the by-information databases based on an input operation from the input unit for providing the navigational content to the presentation unit.

In this configuration, information collected from various media is stored sequentially in the by-information databases and therefore necessary information can be searched for speedily. Again, in this case, the media-based information collection units can access media inside and external to the vehicle to store necessary information in the by-information databases.

BRIEF DESCRIPTION OF THE DRAWINGS

FIG. 8(a) and FIG. 8(b) are diagrams showing display screen switching between when the vehicle is parked and when the vehicle is in motion in the vehicle navigation system in the embodiment of the present invention.

FIG. 13(a) and FIG. 13(b) are diagrams showing an example of reaction changes of the manual input unit in the vehicle navigation system in the embodiment of the present invention.

BEST MODE FOR CARRYING OUT THE INVENTION

A preferred embodiment of the present invention will be described below with reference to the drawings.

Figure 1:
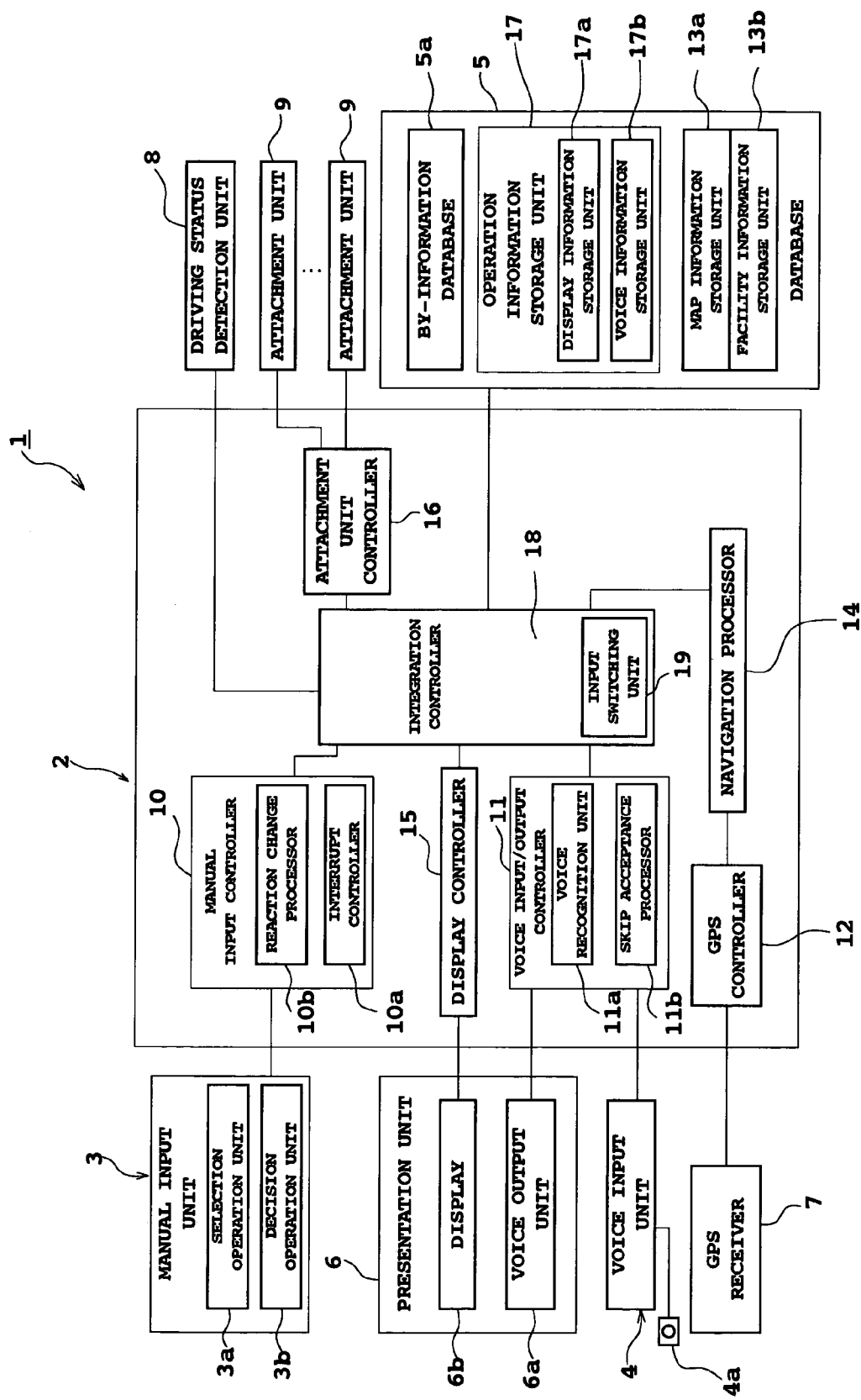
FIG. 1 is a block diagram of the configuration of a vehicle navigation system according to an embodiment of the present invention.

FIG. 1 is a block diagram showing the configuration of a vehicle navigation system 1 (hereinafter simply referred to simply as "navigation system 1") in this embodiment. The navigation system 1 in this embodiment comprises a controller 2 that controls the entire system; a manual input unit 3 that accepts input from the user to operate the navigation system 1; a voice input unit 4 that accepts, through voice, input similar to that of the manual input unit 3; a database 5 in which data necessary for navigation is stored; and a presentation unit 6 on which the navigational content (not only the final navigation results, but also the content that is being input) are presented. The input operation, which can be performed through the voice input unit 4 and which is practically similar to that of the manual input unit 3, need not be completely the same input operation but can be any input operation that can produce the same result. In addition, the presentation unit 6 is any unit that can present navigational content. In the example in FIG. 1, a voice output unit 6a presents the result vocally and a display 6b visually displays the results.

In addition, to detect the current position of the vehicle, a GPS receiver 7, which receives signals from GPS satellites, and a driving status detection unit 8, which detects whether the vehicle is in motion or is parked, are connected to the controller 2. Also connected to the controller 2 are a plurality of attachment units 9 that support vehicle driving. The attachment units 9 may include, for example, a radio receiver, an Internet system, a TV set, a CD-ROM drive, a DVD-ROM drive, and a narrowband wireless system (DSRC), all of which are integrally controlled by the controller 2. A recent trend in vehicle-mounted apparatuses is that the operation panels of the apparatuses are displayed sequentially on the display for integrated management. In addition to the apparatuses described above, an air conditioning system (air conditioner) for creating a comfortable environment within a vehicle, a network device for use as a telephone or for sending or receiving mails, a vehicle information device for managing the vehicle status, an entertainment unit for audio, video games, or fortune telling, an information BOX for various information that can be obtained in and out of the vehicle, and a setting device for managing vehicle settings can also be managed as attachment units 9.

The controller 2 comprises a plurality of individual controllers for controlling the devices of the navigation system 1. For example, the controller 2 may comprise a manual input controller 10 that controls the manual input unit 3; a voice input/output controller 11 that controls the voice output unit (for example, speaker) 6a included in the voice input unit 4 and the presentation unit 6; a GPS controller 12 that is connected to the GPS receiver 7 for calculating the current vehicle position from the received GPS signals; a navigation processor 14 that searches for recommended routes or recommended facilities suitable for a destination or guides the vehicle through a route using the current position obtained by the GPS controller 12 and data from a map information storage unit 13a of the database 5 or from a facility information storage unit 13b; a display controller 15 that controls the display of the display 6b included in the presentation unit 6; and an attachment unit controller 16 that integrally controls the operation of the attachment units 9. In addition, the database 5 comprises an operation information storage unit 17 that stores various information for operating the navigation system 1. This operation information storage unit 17 comprises a display information storage unit 17a that stores icons for commands displayed on the display 6b and the like; and a voice information storage unit 17b that stores voice data output from the voice output unit 6a. In this embodiment, the individual controllers, the database 5, and the driving status detection unit 8 described above are integrally controlled by an integration controller 18 included in the controller 2.

A first feature of the navigation system 1 in this embodiment is that the manual input unit 3 and the voice input unit 4 are provided as input means for operating the navigation system 1 and that a predetermined input operation for navigation is continuously performed, until the final step is reached, by switching the active status between the manual input unit 3 and the voice input unit 4 based on the usage status of the navigation system 1.

Figure 2:
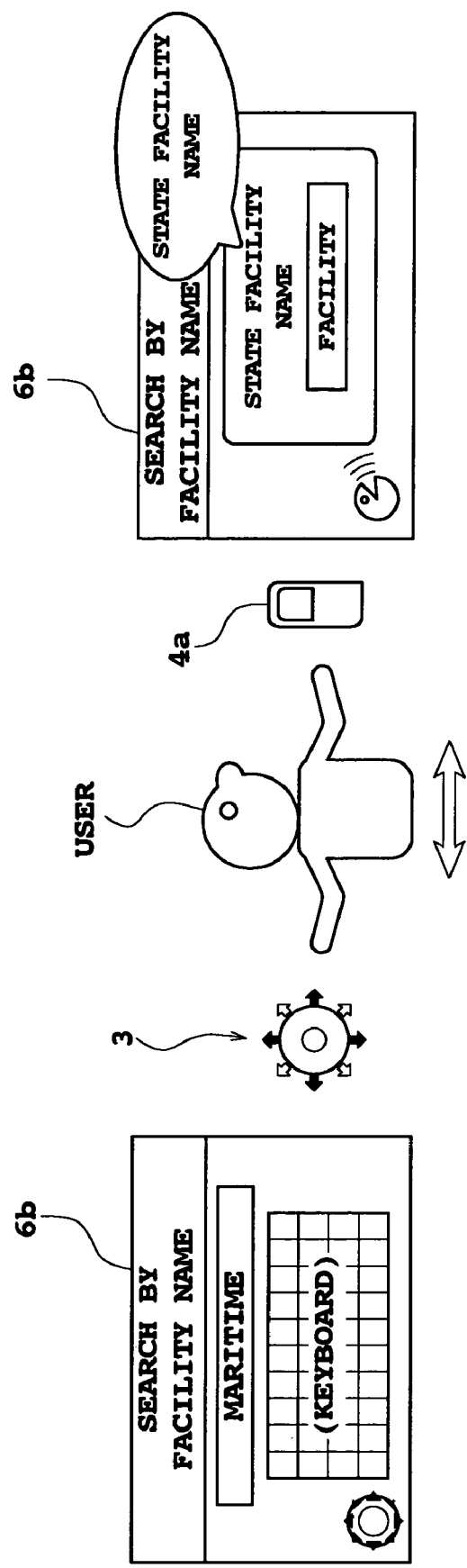
FIG. 2 is a diagram showing how a display screen on the vehicle navigation system in the embodiment of the present invention is switched between when a vehicle is parked and when the vehicle is in motion.

That is, as shown in FIG. 2, the user of the navigation system 1 can perform the input operation while freely switching between manual input and voice input based on his or her wish (instruction). For example, touching the manual input unit 3 activates the manual input operation and displays the manual input mode screen on the display 6b. On the other hand, pressing a speech switch 4a (for example, provided on the steering wheel or the like) during the manual input operation activates the voice input operation and displays the voice input mode screen on the display 6b. On the manual input mode screen shown in the left half of FIG. 2, an example is shown in which the user operates the manual input unit 3 and enters a navigation destination (facility name) by selecting from the keys displayed on the display 6b. On the voice input mode screen shown in the right half of FIG. 2, an example is shown in which the user vocal recites a destination (facility name) for input into the voice input unit 4. Switching between the manual input unit 3 and the voice input unit 4, that is, switching of control between the manual input controller 10 and the voice input/output controller 11, is recognized by an input switching unit 19 in the integration controller 18, and control of the display controller 15, and the programs used in each control, are switched.

As described above, switching between the active status of the manual input unit 3 and that of the voice input unit 4, which can perform practically the same input operation contents, allows the user to perform the input operation of the navigation system 1 easily using an easy-to-use input method, thus increasing the ease of use.

Figure 3:
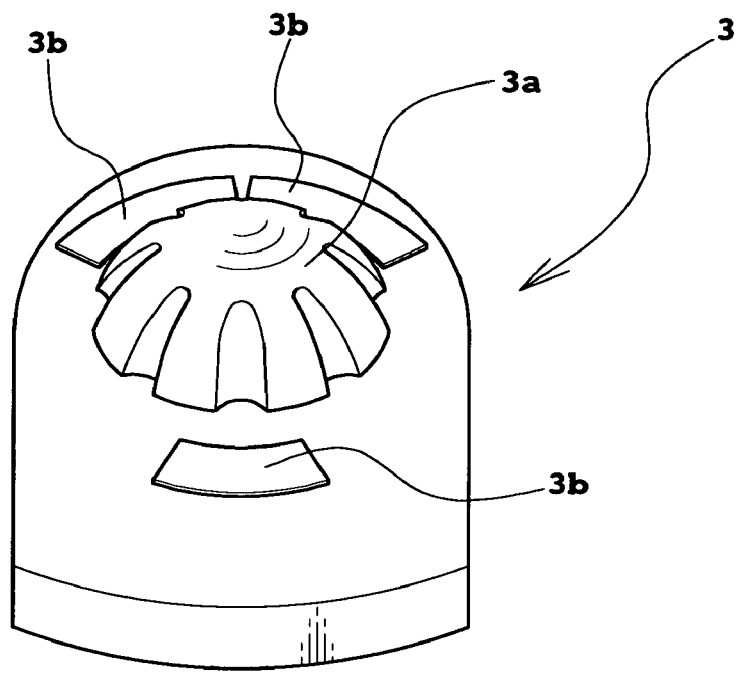
FIG. 3 is an external view of a manual input unit of the vehicle navigation system in the embodiment of the present invention.

FIG. 3 shows an example of the actual shape of the manual input unit 3. The manual input unit 3 comprises a selection operation unit (commander) 3a that can be slid or tilted in multiple directions (for example, eight directions or four directions by switching under software control), and which can also be rotated, and decision operation units (buttons) 3b used to confirm selected items (commands) or having specific functions allocated. The keys or other commands displayed on the display 6b shown in FIG. 2 can be selected by tilting the commander 3a in a desired direction or by rotating it, and the selected key can be confirmed by pressing buttons 3b. Of course, the commander 3a can be pressed in the vertical direction to confirm perform the selection.

Figures 4A, 4B, 4C:
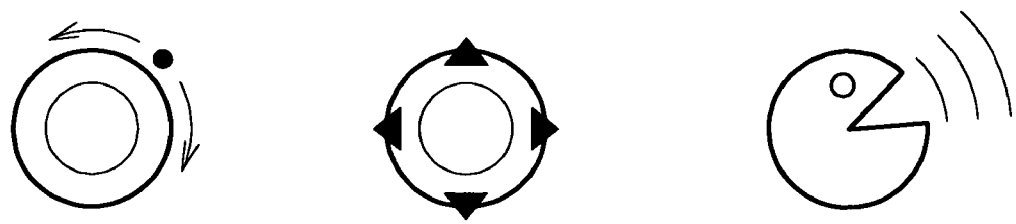
FIG. 4(a), FIG. 4(b), and FIG. 4(c) are diagrams showing characters, which indicate a manual input mode and a voice input mode, displayed on a display of the vehicle navigation system in the embodiment of the present invention.

FIG. 4(a)–FIG. 4(c) show an example of characters used to indicate on the display 6b which of the manual input unit 3 or the voice input unit 4 is active. FIG. 4(a) shows a character displayed when the operation can be selected by rotating the commander 3a on the manual input unit 3. FIG. 4(b) shows a character displayed when the operation can be selected by tilting the commander 3a in one of four directions. When the commander can be tilted in eight directions, eight directional arrows are displayed as shown in FIG. 2. On the other hand, FIG. 4(c) shows a character indicating that the voice input unit 4 is active. By using those characters, the user can easily identify which input unit is active. In particular, changes in the displayed character during driving allows the user to instantly identify which input unit is active. The user can also more easily identify which input unit is active if the color of the character varies between manual input and voice input.

Another feature of the present embodiment is that switching between the the manual input unit 3 and the voice input unit 4 is based on whether or not the vehicle is in motion. That is, the controller 2 judges the usage status of the navigation system 1 based on information from the driving status detection unit 8. The driving status detection unit 8 detects signals from the vehicle speedometer or from sensors provided in the vehicle drive system.

During vehicle driving, it is desirable that manual operations not related to the driving of the vehicle be avoided to the extent possible. In particular, normal operation of the navigation system involves entry and configuration of multiple information items. That is, the user must frequently view the display 6b for confirmation. Therefore, in this embodiment, it is recommended that, during vehicle driving, the voice input unit 4, which does not require the confirmation of the display 6b, be used during input operation in most cases.

It is a commonly practiced rule in automotive design that the number of operations not directly related to the driving operation performed during driving is limited to three operations per one function, that operations involving display screen scrolling during driving be inhibited, and that the operation time of any one operation is limited to a predetermined time such as, for example, one second. Therefore, in this embodiment the invention is configured such that the voice input unit 4 is forcibly activated when, during driving, the number of operations on the manual input unit 3 exceeds a predetermined number of operations (for example, three or more operations). Because the controller 2 switches the active status between the manual input unit 3 and the voice input unit 4 as required in the navigation system 1 to allow one input operation, which is active, to continue a predetermined navigation search operation until the final step is executed, the content of manual input operation executed up to that moment can be passed to the voice input operation without change.

Referring to FIGS. 5(a)–(d), FIGS. 6(a)–(d), and FIGS. 7(a)–(c), in the following will be described continuation of the input operation without interruption, even when the usage status of the navigation system 1 changes between when the vehicle is parked and when the vehicle is in motion during the input operation of the navigation system 1. FIG. 5(a)–FIG. 7(c) show the content displayed on the display 6b when the vehicle is stopped, and when the vehicle is in motion. It can be seen from those figures that the content displayed in both situations indicates substantially the same operation.

Figure 5A:
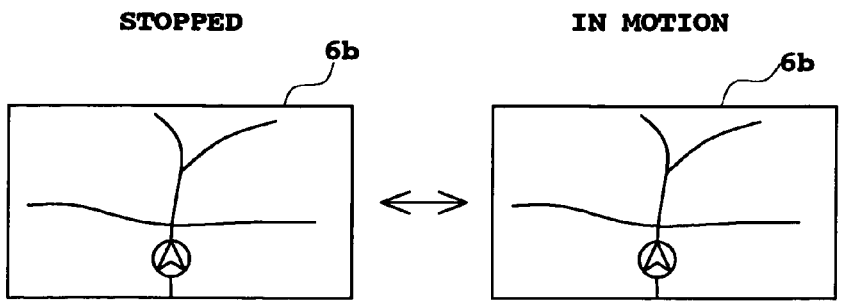
FIG. 5(a), FIG. 5(b), FIG. 5(c), and FIG. 5(d) are diagrams showing the first part of display screen switching between when the vehicle is parked and when the vehicle is in motion in a series of navigation processing in the vehicle navigation system in the embodiment of the present invention.

In each of FIGS. 5(a)–FIG. 7(c), the left-hand screen is the display screen when the vehicle is stopped and the right-hand screen is the display screen when the vehicle is in motion. FIG. 5(a) shows initial screens on which the current position of the vehicle is displayed on the map. As described above, the current position is identified by the GPS system.

Figure 5B:
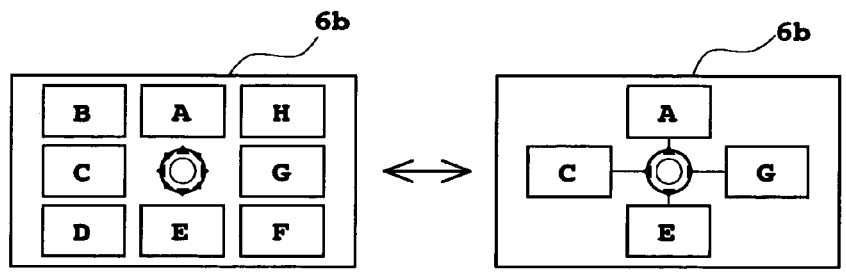

FIG. 5(b) shows the menu screen. This menu screen can be displayed by pressing the button 3b provided on the manual input unit 3. The screen may also be displayed by vocalizing "Menu" after pressing the speech switch 4a. At this time, when the controller 2 judges that the vehicle is stopped, the controller 2 displays the full menu as shown in the left half in FIG. 5(b). As described above, the vehicle has multiple attachment units 9 installed today and, in many cases, the operation of them is integrated. Therefore, when the full menu is displayed, the user can select from a total of eight icons: "Navigation", "Network", "Air conditioner", "Setting", "Audio", "Entertainment", "Information BOX", and "Vehicle information". In FIG. 5(b), "Navigation" is replaced by "A", "Network" by "B", "Air conditioner" by "C", "Setting" by "D", "Audio" by "E", "Entertainment" by "F", "Information BOX" by "G", and "Vehicle information" by "H" for the sake of simplicity. On the other hand, when the controller 2 judges that the vehicle is in motion, the menu screen containing only major items is displayed as shown in the right half of FIG. 5(b). In this embodiment, four icons are displayed: "Navigation", "Air conditioner", "Audio", and "Information BOX".

In this manner, the number of display items is minimized to increase visibility during driving. Minimizing the number of display items also enables the size of each icon to be increased, which still further increases visibility. The icons displayed in FIG. 5(b) can be selected by operating the commander 3a. Of course, they can also be selected by operating the speech switch 4a and reading an item name aloud. The letters of "Navigation", "Network", "Air conditioner" and so on displayed in the menu correspond to commands used for speech (voice commands). Therefore, the voice commands can be understood simply by viewing the screen of the display 6b. This eliminates the need for referencing the instructions manual to check the voice commands, increasing the ease of use. In the description below, the letters displayed on the screen correspond to voice commands.

Figure 5C:
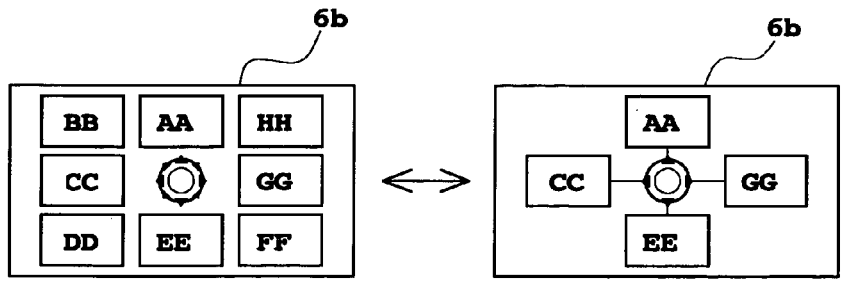

FIG. 5(c) shows the screens displayed when the Navigation icon is selected in FIG. 5(b). On the left-hand screen shown in FIG. 5(c) displayed when the vehicle is not in motion, are displayed "Search for destination", "Edit vehicle position", "Search for another route", "Specify arrival time", "Return home", "Edit route", "Return to departure place", and "Route information". In FIG. 5(c), "Search for destination" is replaced by "AA", "Edit vehicle position" by "BB", "Search for another route" by "CC", "Specify arrival time" by "DD", "Return home" by "EE", "Edit route" by "FF", "Return to departure place" by "GG", and "Route information" by "HH" for the sake of simplicity. Here, "Search for destination" is a command for setting a destination. "Edit vehicle position" is a correction editing command, which is used when the vehicle position display based on GPS processing displayed on the display 6b does not match the actual vehicle position (the direction of the vehicle or displayed position), so that both positions actually match. "Search for another route" is a command used to search for a route different from a recommended driving route presented by the navigation system 1. "Specify arrival time" is a command used for calculating a driving schedule for moving to the destination according to the specified time. "Return home" is a command used to search for a route for returning home, which is registered, from the current position. "Edit route" is an editing command used for calculating a recommended route considering a stopover location. "Return to departure place" is a command used for returning to a place where route guidance was started. "Route information" is a command for obtaining information on a route presented as a recommended route.

As described above, it is desirable that the screen displayed while the vehicle is in motion be simple. Therefore, when "Navigation" is selected in FIG. 5(b) while the vehicle is in motion, only the frequently used icons are displayed as shown in the right half of FIG. 5(c). In FIG. 5(c), four items are displayed: "Search for destination", "Search for another route", "Return home", and "Return to departure place". Of course, the user can freely customize the items to be displayed on this screen.

Figure 5D:
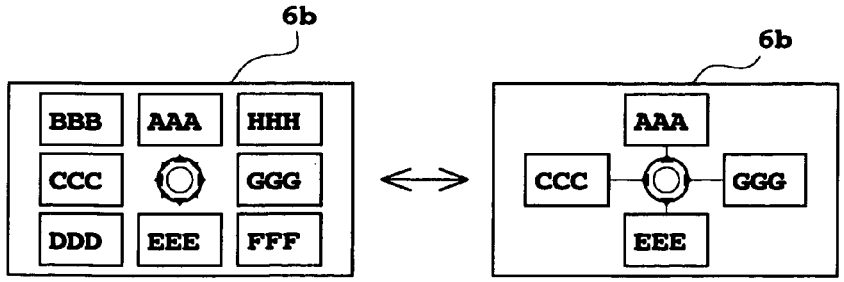

When the selection operation is further continued and, for example, "Search for destination" is selected in FIG. 5(c), "Search by facility name", "Search by genre", "Search by registered name", "Search by telephone number", "Search by nearby facility", "Search by history", "Search by region", and "Search by address" are displayed when the vehicle is stopped, as shown in the left side of FIG. 5(d). For simplicity, in FIG. 5(d) "Search by facility name" is replaced by "AAA", "Search by genre" by "BBB", "Search by registered name" by "CCC", "Search by telephone number" by "DDD", "Search by nearby facility" by "EEE", "Search by history" by "FFF", "Search by region" by "GGG", and "Search by address" by "HHH".

Here, "Search by facility name" is a command that searches for a destination based on an input facility name. "Search by genre" is a command that searches for a destination based on an input such as "amusement park", "department store", "station", or the like. "Search by registered name" is a command that searches for a destination based on the input of selections such as "○○ hotel", "grandfather's house", "○○ building", or the like, from among choices pre-registered by the user. "Search by telephone number" is a command that searches for a destination based on the input of the telephone number of a target facility. "Search by nearby facility" is a command that requests the presentation of facilities near the current position, such as "restaurant", "parking lot", "bank", and "convenience store", and searches for a destination based on the input of selections. "Search by history" is a command that searches for a destination based on the selection from items selected by the user in the past and stored in the database 5 as history data. "Search by region" is a command that displays a map based on the input of a vague region name and searches for a destination by selecting from the map. "Search by address" is a command that searches for a destination based on the input of an address itself.

As described above, when "Search for destination" is selected in FIG. 5(c) while the vehicle is in motion, only the frequently-used icons are displayed as shown in the right half of FIG. 5(d). In FIG. 5(d), four items are displayed: "Search by facility name", "Search by registered name", "Search by nearby facility", and "Search by region".

In all of FIGS. 5(b)–(d), the character of the commander 3a, which indicates that a selection can be made through the operation of the commander 3a, is displayed on the display 6b. In all figures, the character indicating that a selection can be made from eight items is displayed on the screen that is displayed when the vehicle is stopped, and the character indicating that a selection can be made from four items is displayed on the screen that is displayed when the vehicle is in motion.

As described above, it is not desirable to request an operation that frequently confirms the display of the display 6b while the vehicle is in motion. Therefore, when the number of operations on the manual input unit 3 executed while the vehicle is in motion exceeds a predetermined number (for example, three or more operations), this embodiment is configured such that the voice input unit 4 is forced to activate. That is, the screen in FIG. 5(d) indicates a third navigation operation. Therefore, the controller 2 forces the voice input unit 4 to activate from the next operation if a selection is made on the screen shown in FIG. 5(d) while the vehicle is in motion.

Figure 6A:
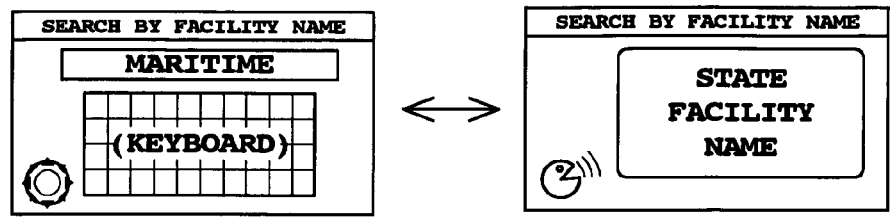
FIG. 6(a), FIG. 6(b), FIG. 6(c), and FIG. 6(d) are diagrams showing the middle part of display screen switching between when the vehicle is parked and when the vehicle is in motion in a series of navigation processing in the vehicle navigation system in the embodiment of the present invention.

That is, as shown in the right half of FIG. 6(a), the character indicating that voice input is activated is displayed on the display 6b beginning with the fourth operation and, in addition, the message "state facility name" is output from the voice output unit 6a. At the same time, the system enters the voice input acceptance status via a voice recognition unit 11a of the voice input/output controller 11 to allow the user to perform the voice input operation via the voice input unit 4. For example, by stating "maritime museum", the voice recognition unit 11a identifies an input command. On the other hand, while the vehicle is parked, a facility name such as "maritime museum" may be keyed in using the commander 3a.

Figure 6B:
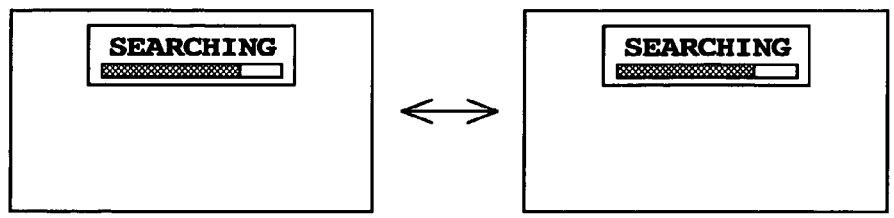
Figure 6C:
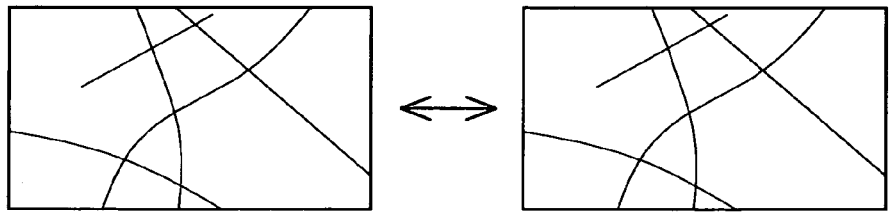

When an input of a facility name through manual input or voice input is recognized, the navigation processor 14 acquires information from the map information storage unit 13a and the facility information storage unit 14b in the database 5 as required, as well as traffic information required for navigation, as shown in FIG. 6(b) and begins searching for "maritime museum" that is the destination of the navigation. This search processing is performed in the same way while the vehicle is parked or in motion and, as shown in FIG. 6(c), the destination map is displayed.

Figure 6D:
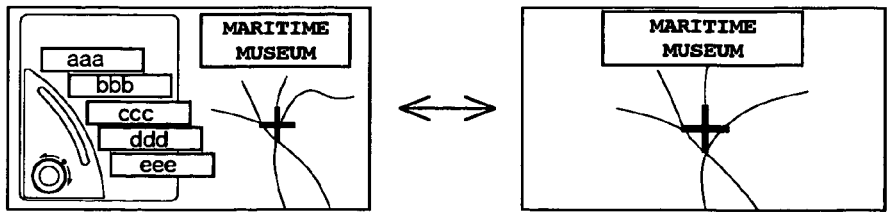

When "maritime museum", which is the destination, is searched for, information on the "maritime museum" and a map are displayed along with questions as to what action the user is going to take for "maritime museum", are displayed on the display 6b while the vehicle is parked as shown in FIG. 6(d). In FIG. 6(d), questions such as "Visit", "Stopover", "Register", "Detailed information", and "Telephone" are displayed on the screen to prompt the user to select one using of the commander 3a. For simplicity, in FIG. 6(d) "Visit" is replaced by "aaa", "Stopover" by "bbb", "Register" by "ccc", "Detailed information" by "ddd", and "Telephone" by "eee". On the other hand, only "maritime museum" and an associated map are displayed while the vehicle is in motion, and questions such as "Visit here?" or "Stop over here?" are output from the voice output unit 6a. When the user enters a predetermine voice command, such as "Yes", via the voice input unit 4, the visit to "maritime museum" is confirmed. As will be described later, when the message "Visit here?" is output from the voice output unit 6a, it is possible to output another message, such as "Visit" or "Register", by rotating or touching the commander 3a. In each situation, the answer is confirmed by entering a command such as "Yes". When the question "Visit here?" is output from the voice output unit 6a while the vehicle is in motion, the user can directly enter a predetermined voice command such as "Visit", "Stopover", "Register", "Detailed information", or "Telephone" via the voice input unit 4 to confirm the action the user wishes to take for "maritime museum". When "Visit here?" is output from the voice output unit 6a, the user can rotate or touch the commander 3a to output a voice command that can be entered through voice from the voice input unit 6a such as "Visit here" or "Stop over". In such a case, the answer to the question is confirmed by pressing the button 3b when a user-desired voice command is output from the voice output unit 6a. That is, even when the user forgets a voice command, the user can simply rotate the commander 3a to remember a voice command that can be entered and therefore the user's memory of voice commands is complemented. In this way, this embodiment provides a complementary function that helps the user in the input operation by temporarily activating the manual input unit 3, even during a voice input period.

Figure 7A:
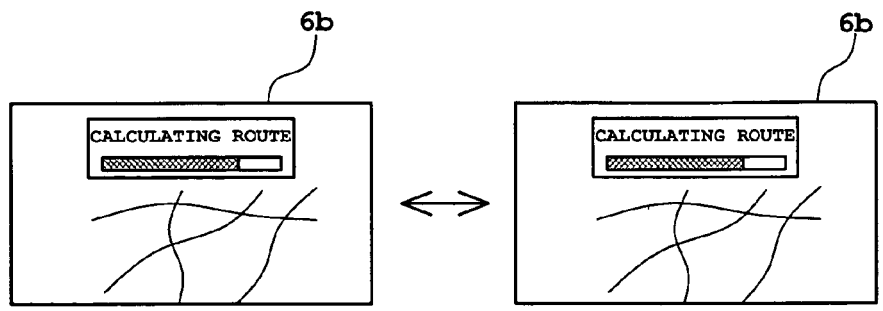
FIG. 7(a), FIG. 7(b), and FIG. 7(c) are diagrams showing the final part of display screen switching between when the vehicle is parked and when the vehicle is in motion in a series of navigation processing in the vehicle navigation system in the embodiment of the present invention.
Figure 7B:
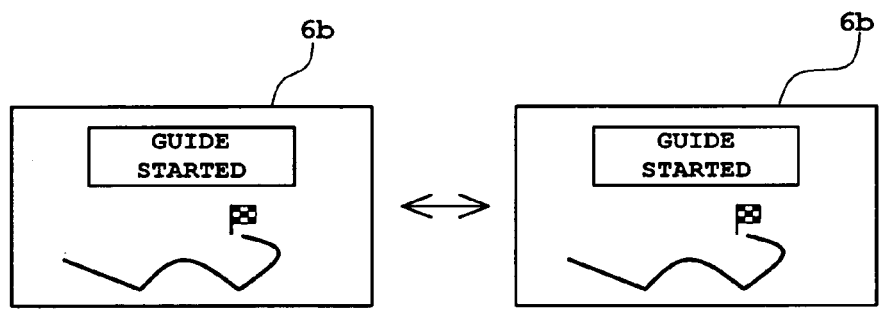
Figure 7C:
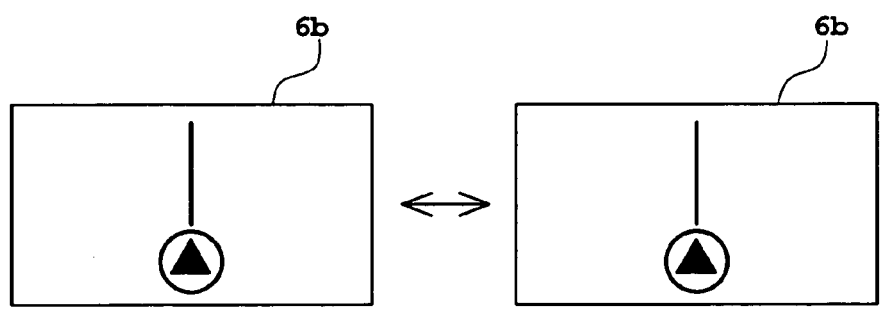

When "Visit maritime museum" is confirmed by the operation of the commander 3a or by the voice recognition unit 11a in the situation in FIG. 6(d), the navigation processor 14 begins to calculate a recommended route as shown in FIG. 7(a). When the calculation of a recommended route is complete, the entire map, including the recommended route and the destination, is displayed on the display 6b for a predetermined time (for example, two seconds) as shown in FIG. 7(b), the message "Guidance started" is output, and the detailed route guidance is started with the current vehicle position as the center as shown in FIG. 7(c). In the figures, the displayed contents or items to be entered next are output from the voice output unit 6a as voice guidance while the vehicle is in motion.

As described above, the processing program based on the manual input operation and the processing program based on the voice input operation are prepared such that in this embodiment they can always be executed in parallel. Because the content of the manual input operation and the voice input operation are substantially the same, the input operation to be executed continuously even when the manual input operation and the voice input operation are arbitrarily switched. In particular, even if the usage status of the navigation system 1 is changed from the stopped status to the in-motion status during the input operation, the system can perform the input operation continuously and can perform an efficient, smooth input operation.

Of course, even in FIGS. 5(*b*)–(*d*) where the manual input operation is required, the user can press the speech switch 4*a* and, through the voice input operation, select and confirm a displayed command. It should be noted that the displays shown in FIG. 5(*a*) to FIG. 7(*c*) are examples only, and that the display screens and questions are changed as necessary according to selected commands.

In this embodiment, better visibility and operability while the vehicle is in motion are taken into consideration. That is, even when a visual check is required for the display 6*b*, the embodiment is configured so that the user can identify the contents at a glance. For example, when the navigation system 1 is switched from the parked status to the in-motion status during the operation of the navigation system 1 as shown in FIG. 8(*a*), the contents displayed on the display 6*b* are switched to the minimum contents to enable the user to recognize the displayed contents easily, even while the vehicle is in motion. In addition, when the user must select from a plurality of questions as shown in FIG. 8(*b*), the actual questions are displayed in letters while the vehicle is parked; on the other hand, while the vehicle is in motion, the minimum number of questions are displayed and, in addition, a simple display is used so that the user can understand how many questions are on the display and operate the commander 3*a* without looking at it in order to get the questions presented through voice. That is, even after the vehicle begins to move, the user continue the input operation easily. The letters in FIG. 8(*a*) and FIG. 8(*b*) are displayed also in a simple alphabetic format as in FIG. 5(*b*). In the figures referenced in the description below, the simple format is used where appropriate.

Figure 9A:
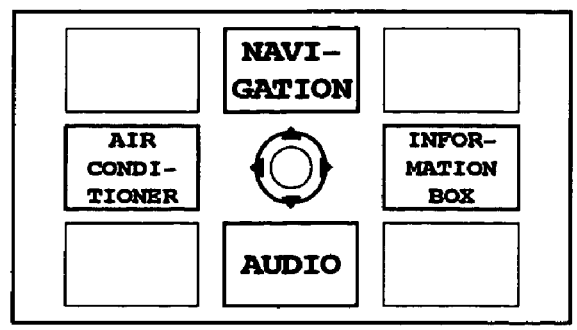
FIG. 9(a), FIG. 9(b), and FIG. 9(c) are diagrams showing an example of display during voice input time in the vehicle navigation system in the embodiment of the present invention.
Figure 9B:
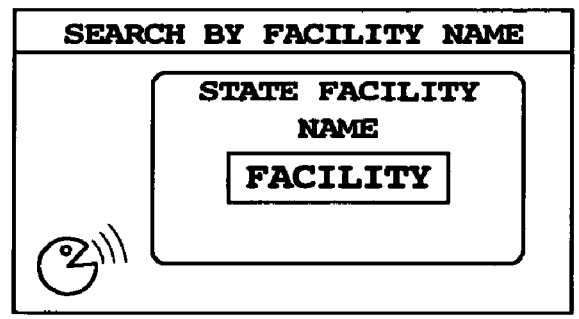
Figure 9C:
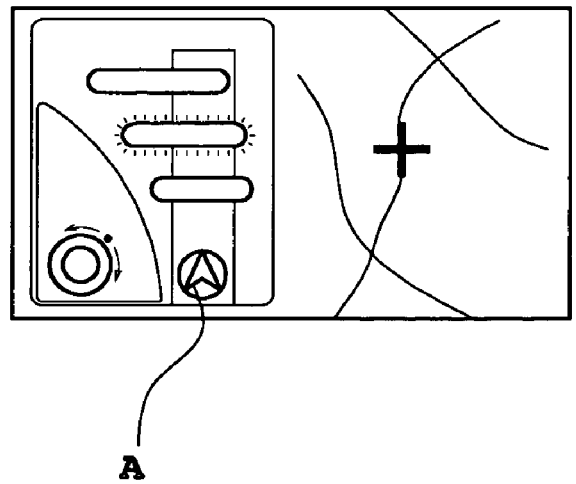

In addition, on the menu screen during the voice input operation, only the minimum required items are displayed, and these are enlarged to increase visibility as shown, for example, in FIG. 9(*a*). The contents to be input via voice are displayed enlarged as shown in FIG. 9(*b*) and, at the same time, the same content is output via voice messages. In addition, when the user must select from a relatively large number of items during the voice input operation, the minimum number items are displayed and, as shown in FIG. 9(*c*), the items selectable via the commander 3*a* and the position of the selected item are displayed in an easy-to-understand format. In the case shown in FIG. 9(*c*), the facilities from which the user will select are displayed in ascending order of distance from the current vehicle position A with the mark of each facility gradually lengthened as the facility becomes more distant and with the mark of the selected facility displayed in a different color. At this time, voice messages such as "Second, on the left side 300 meters ahead" and "Press Confirm if you agree" are output.

Figure 10A:
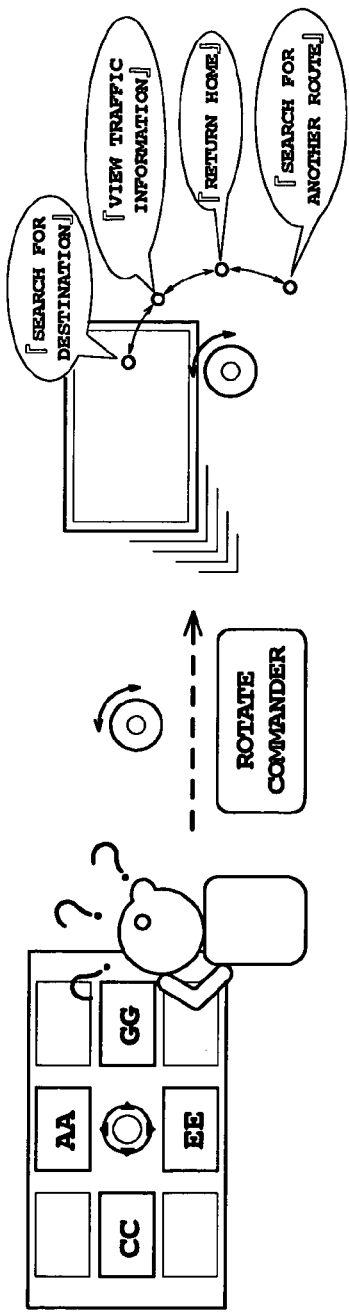
FIG. 10(a), FIG. 10(b), and FIG. 10(c) are diagrams showing interrupt processing during voice input time in the vehicle navigation system in the embodiment of the present invention.
Figure 10B:
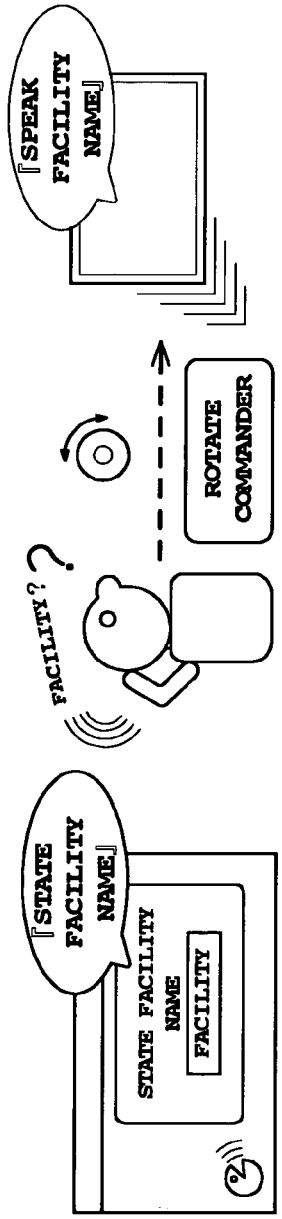
Figure 10C:
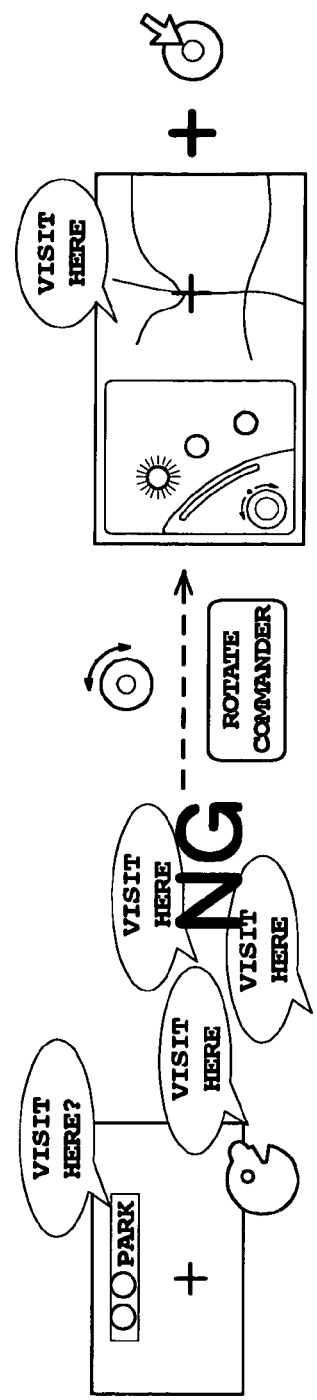

In this embodiment, although the number of items displayed on the display 6*b* is minimized for easier recognition while the vehicle is in motion as described above, recognition of those items remains difficult in many cases. To solve this problem, the navigation system 1 in this embodiment provides a "help mode" in which the user can rotate or touch the commander 3*a* even during the voice input operation, as shown in FIG. 10(*a*), to sequentially output the display items vocally. This function is implemented by an interrupt controller 10*a* in the manual input controller 10. In such a case, operating the commander 3*a* causes the manual input operation to interrupt the voice input operation, which is active, to allow the display items to be repeatedly output any number of times. When an item to be selected is output, the user presses the button 3*b*, enters the confirmation command "Yes" from the voice input unit 4, or directly enters a clearer voice command "Visit here" to confirm the selection easily.

Similarly, if the user fails to hear the voice guidance output from the voice output unit 6*a* during the voice input operation as shown in FIG. 10(*b*), the user can rotate or touch the commander 3*a* to cause the interrupt controller 10*a* to function to output the same contents repeatedly. As a result, this ensures that the user will be able to know the content to be executed next, and prevents interruption of the input operation.

In addition, when voice input is used, the voice recognition unit 11*a* sometimes fails to recognize the voice input contents as shown in FIG. 10(*c*). In such a case, there are many causes for the failure such as ambient noise, user accent, and speech timing. Even in such a case, the user can rotate or touch the commander 3*a* to cause the interrupt controller 10*a* to function, with the result that the simple display (mark display) corresponding to the voice input contents examples, such as "Visit here", "Stop over", and "Register", is temporarily output and, in addition, a voice command is output as the voice guidance. When a voice command the user desires to enter is output, the user can operate the commander 3*a* to make a selection to continue voice input.

Figure 11:
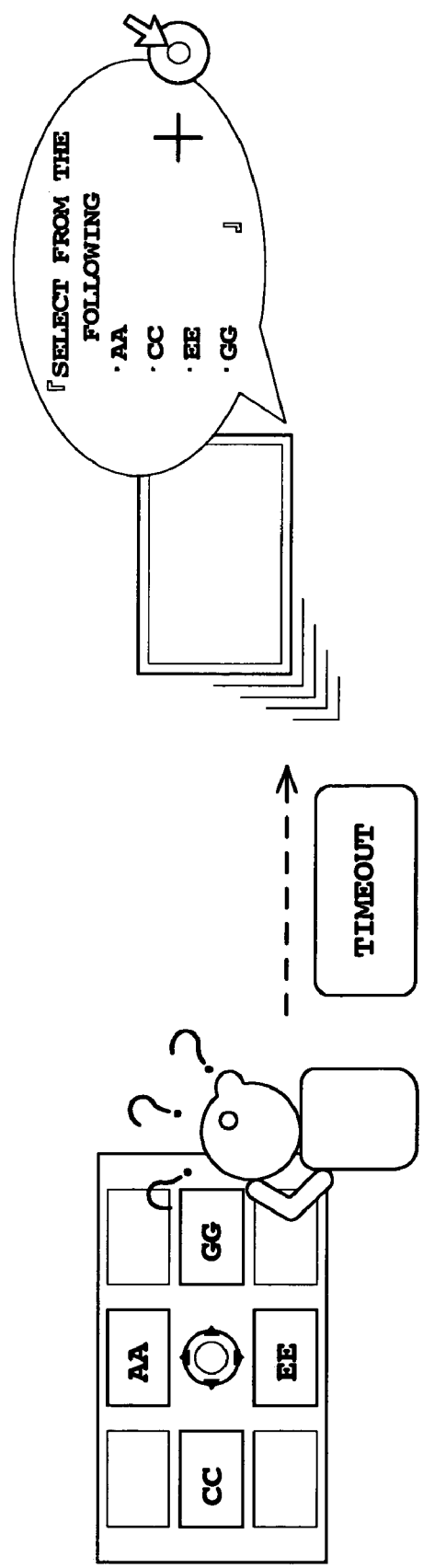
FIG. 11 is a diagram showing processing performed when voice input is suspended in the vehicle navigation system in the embodiment of the present invention.

When the input of a voice command is required during the voice input operation but no input is received for a predetermined time (for example, ten seconds) because, for example, the user does not know which command to enter (the voice recognition unit 11*a* does not recognize a command) as shown in FIG. 11, the controller 2 automatically performs timeout processing to cause the voice input/output controller 11 to output input commands using voice. When a desired command is read, the user can confirm the command with the use of the button 3*b* or repeat the command and enter it by vocally confirming the command.

Figure 12:
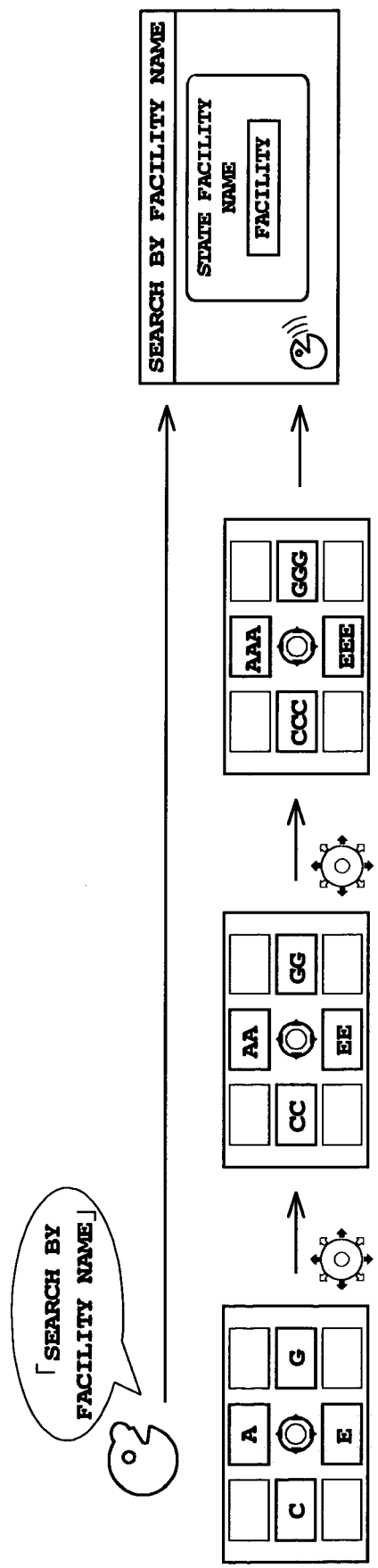
FIG. 12 is a diagram showing skip processing during voice input time in the vehicle navigation system in the embodiment of the present invention.

In addition, for more efficient and smooth input operation, the navigation system 1 in this embodiment has a skip acceptance processor 11*b* in the voice input/output controller 11 for skipping, at voice input time, a predetermined part of the input operation which is performed during manual input time. When entering the name of a facility for setting the destination using manual input, "Navigation" is first selected from the menu screen in hierarchy (1), "Search for destination" is selected in hierarchy (2), "Search by facility name" is selected in hierarchy (3), and "Enter (state) facility name" is output in hierarchy (4), as shown in FIG. 12.

By contrast, during voice input, the user can state "Search by facility name" directly, skip hierarchies (1)–(3), and proceed to "Enter (state) facility name" in hierarchy (4). As a result, the input steps can be simplified. This is because substantially the same content can be input through either manual or voice input. Therefore, a skilled user who has mastered input commands used for the manual input operation can easily use this skip function. In other words, a user not skilled in the operation can use the manual input operation and sequentially operates the system to smoothly perform a predetermined operation without mistake; at the same time, the user can learn the input commands little by little and, after the user becomes a skilled user, use the skip function easily. Of course, the same effect can be achieved by entering the telephone number or the address of a facility and skip the entry of the target facility or the destination.

As described above, the navigation system 1 in this embodiment switches the active status between the manual input operation and the voice input operation as necessary and executes a predetermined input operation for navigation using the active input operation, until the final step is reached to present the navigational content. Therefore, the commander 3*a* is sometimes used to perform the manual input operation during the voice input operation. The commander 3*a* may also be used to complement the input operation of voice input. In particular, because voice input is often used while the vehicle is in motion, the operation of the commander 3*a* is performed without looking at it in many cases. Thus, when performing the input operation using the manual input unit 3, this embodiment is configured such that the response (reaction) to the operation direction of the manual input unit 3, that is, the commander 3*a*, is changed according to the navigational content (items) displayed on the display 6*b*. The change in the reaction is controlled by a reaction change processor 10*b* in the manual input controller 10. For example, the division of the area, in which the commander 3*a* can be tilted, is changed between when a selection is made from eight items and when a selection is made from four items as shown in FIG. 13(*a*) to allow the selection from eight items or from four items to be made reliably. When an item selection is made through the rotation operation of the commander 3*a*, the click feeling is provided according to the number of items as shown in FIG. 13(*b*). This click feeling can be created by increasing the rotation resistance at predetermined positions (predetermined rotation angles) with respect to the rotation direction. To prevent the commander 3*a* from being rotated more than necessary, the rotation resistance at both ends of the movable area should be set to a high value (to such an extent that the user cannot easily rotate). For continuous rotation operation, the rotation resistance may be changed according to the amount of rotation. In addition, the rotation range may also be set.

As described above, although there is only one manual input unit 3, changing its reaction gives a reaction that varies according to the presented navigational content (selection items), making it possible for the user to perform an appropriate selection operation according to the reaction of the manual input unit. In addition, the feeling of the manual input unit 3 (commander 3*a*) can be changed to enable the user to easily feel the operation status in order to reduce the operational burden on the user. A beep can be generated during operation to indicate a change in the reaction of the commander 3*a*, and the beep may also be changed according to the operation pattern.

Figure 14:
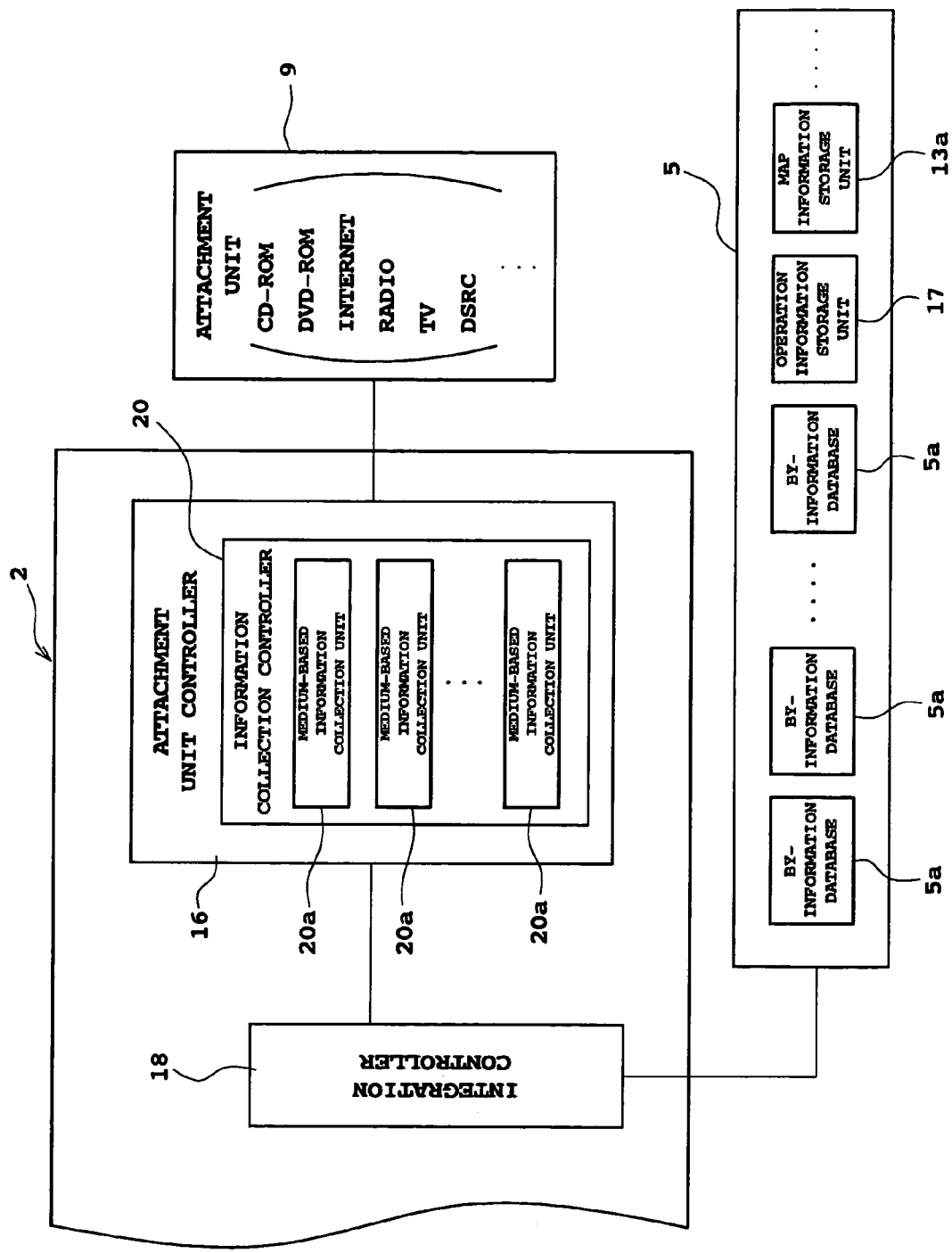
FIG. 14 is a block diagram showing the configuration of an information collection controller and a database in the vehicle navigation system in the embodiment of the present invention.

High accuracy navigation processing requires the building of a rich database 5. In the navigation system 1 in this embodiment, the attachment unit controller 16 collects data to be stored in the database 5 as shown in FIG. 14. The attachment unit controller 16 comprises an information collection controller 20 that includes a plurality of media-based information collection units 20*a*. As described above, the attachment unit controller 16 integrally controls attachment units installed on a vehicle, such as a radio receiver, Internet system, TV set, CD-ROM drive, DVD-ROM drive, and narrow band wireless system (DSRC). The media-based information collection units 20*a*, each of which corresponds to an attachment unit, sequentially collect necessary information. In the case of the navigation system 1 in this embodiment, because information on the area or date/time of a navigation target is collected, during the input operation for the navigation, information associated with the area and the date/time is collected automatically using the attachment units and this collected information is stored in by-information databases (information BOX) 5*a* in the database 5 according to the type of collection information.

Figure 15:
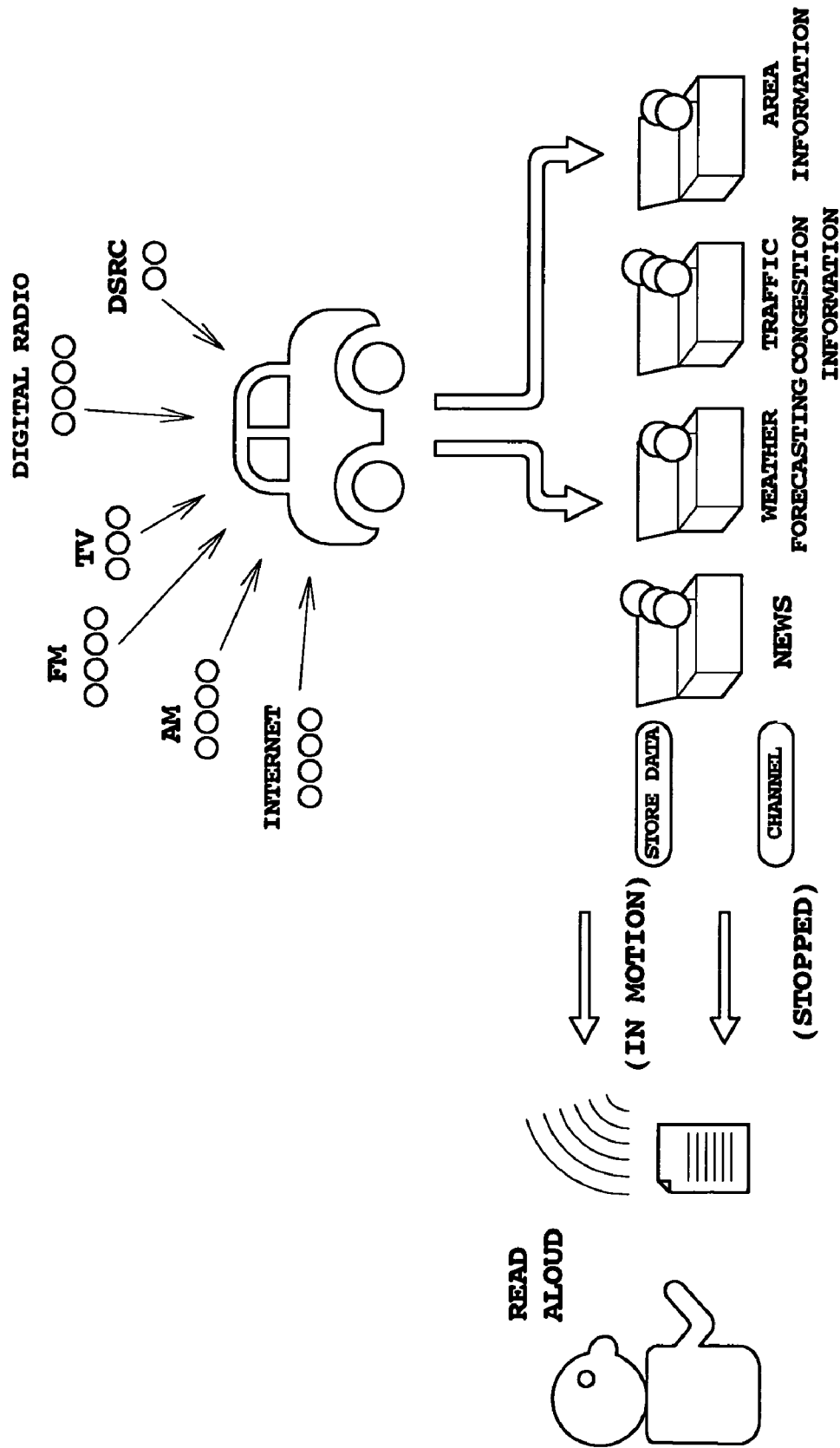
FIG. 15 is a diagram showing an example of how the database is built in the vehicle navigation system in the embodiment of the present invention.

For example, traffic congestion information, which is vital for navigation processing, is provided individually from a radio receiver, the Internet, a TV set, a narrowband communication system, or the like. Some users may find selection of a medium or a channel in order to obtain this information tedious and, if the selection of a medium is incorrect, the information obtained may not be the most appropriate or most recent. In this embodiment, items set up by the user in advance, such as "traffic congestion information", "area information", and "weather forecasting", are sequentially collected from the media through machine search as shown in FIG. 15. Of course, necessary information can be collected from CD-ROMs, DVD-ROMs, and other media in the vehicle. The by-information databases 5*a* which have been built can be directly read in response to a request from the navigation processor 14 and, in addition, a list of information stored in the by-information databases 5*a* can be displayed for each item in response to an information BOX usage request issued by the user on the menu screen while the vehicle is stopped. While the vehicle is in motion, the information can be output by reading it via the voice output unit 6*a*.

Sequentially storing information according to the information type as described above enables the user to easily select and use high-quality information.

The by-information databases (information BOX) 5*a* can be used, for example, for collecting news or for collecting music. For example, by setting "news on ○○" in advance, the media-based information collection unit 20*a* collects desired news via a radio receiver, a TV set, the Internet, and soon. By setting 1 "information on singer: ○○", the information is collected from a radio receiver, a TV set, the Internet, and CD-ROMs or DVD-ROMs in the vehicle, to store the predetermined information in the information BOX 5*a*.

When the navigation system 1 is operated through manual input operation with the information set up in the by-information databases 5*a* (information BOX) as described above or through the voice input operation, the information source need not be entered, and necessary information can be easily accessed. As a result, the navigation operation is simplified and a desired navigation search can be completed smoothly and continuously.

The configurations shown in FIG. 1, FIG. 3, and FIG. 14 are only exemplary and, of course, may be replaced as desired with configurations having equivalent functions. The display screens are also exemplary and may be modified as necessary.

INDUSTRIAL APPLICABILITY

As described above, the vehicle navigation system according to the present invention is suitable for simplifying the input operation for navigation processing. In particular, the navigation system is suitable for increasing the ease of use of navigation related searches, which can be made smoothly and continuously whether or not the vehicle is in motion and whether the input operation is performed through manual input or voice input.

What is claimed is:

1. A vehicle navigation system comprising:
   a presentation unit presenting navigational content;
   a manual input unit accepting a plurality of input operations;
   a voice input unit accepting vocally input operations of substantially the same content as those of said manual input unit;

a database storing data necessary for navigation; and a controller searching said database based on the input operations of the manual input unit or the voice input unit for presenting navigational content on said presentation unit, wherein said controller switches an active status between said manual input unit and said voice input unit based on a usage status of said navigation system, continues predetermined input operations for navigation until a final step is reached, and presents the navigational content.

2. The vehicle navigation system according to claim 1 wherein said controller identifies the usage status of said navigation system based on whether or not the vehicle is in motion, and switches the active status between said manual input unit and said voice input unit.

3. The vehicle navigation system according to claim 2 wherein said controller forces the voice input unit to activate when a number of operations of said manual input exceeds a predetermined number while the vehicle is in motion.

4. The vehicle navigation system according to claim 1 wherein said controller switches the active status between said manual input unit and said voice input unit for mutually complementing each other between the input operations of said manual input unit and those of said voice input unit.

5. The vehicle navigation system according to claim 2 wherein, when the usage status of said navigation system indicates in-motion status, said controller displays the navigational content in an enlarged format on a display of said presentation unit.

6. The vehicle navigation system according to claim 5 wherein, when the usage status of said navigation system indicates in-motion status, said controller displays the navigational content in an enlarged, simplified format on the display of said presentation unit and, at the same time, vocally presents the displayed content.

7. The vehicle navigation system according to claim 1, wherein said controller includes a skip acceptance processor that skips a portion of operation steps necessary for input operations using the manual input unit when said voice input unit accepts corresponding input operations.

8. The vehicle navigation system according to claim 1, wherein said controller includes a reaction change processor that causes said manual input unit to change a reaction in the manual input unit according to the navigational content presented on the presentation unit when the input operations are performed using said manual input unit.

9. The vehicle navigation system according to claim 1 wherein, when the input operations are suspended for at least a predetermined length of time during the input operations of said manual input unit or said voice input unit, said controller gives vocal guidance on a next operation.

10. The vehicle navigation system according to claim 1 wherein said controller includes an interrupt controller that gives guidance on the voice input operation through an interrupt operation of the manual input unit during the input operation via said voice input unit.

11. The vehicle navigation system according to claim 1 wherein said controller switches the active status between said manual input unit and said voice input unit for controlling vehicle attachment units.

12. The vehicle navigation system according to claim 1
wherein said controller includes a plurality of media-based information collection units and wherein said database comprises by-information databases each individually storing information in one category, said information being obtained by said media-based information collection units from a plurality of media.

13. The vehicle navigation system according to claim 12 wherein said media-based information collection units access media inside and external to the vehicle to store information in the by-information databases.

14. A vehicle navigation system comprising:

a presentation unit presenting navigational content;

an input unit accepting a plurality of input operations;

media-based information collection units each collecting information in one category from a plurality of media;

by-information databases each individually storing information collected in one category; and a controller searching said by-information databases based on an input operation from the input unit for providing the navigational content to said presentation unit.

15. The vehicle navigation system according to claim 14 wherein said media-based information collection units access media inside and external to the vehicle to store information in the by-information databases.

16. A navigation method for a vehicle, accepting a plurality of manual input operations;

accepting one or more vocally input operations having substantially the same content as the manual input operations;

searching a database having stored data necessary for navigation based on at least one of the manual input operations and the vocally input operations; and presenting navigation content based upon the searching, wherein the searching further comprises continuing predetermined input operations for navigation until a final step is reacted while switching acceptable input types between the manually input operations and the vocally input operations based upon traveling conditions of a vehicle.

* * * * *